(12) United States Patent
Falcon

(10) Patent No.: US 10,234,130 B2
(45) Date of Patent: Mar. 19, 2019

(54) ILLUMINATING DREAMCATCHER NOVELTY APPARATUS

(71) Applicant: Autumn Falcon, Sisseton, SD (US)

(72) Inventor: Autumn Falcon, Sisseton, SD (US)

(*) Notice: Subject to any disclaimer, the term of this patent is extended or adjusted under 35 U.S.C. 154(b) by 0 days.

(21) Appl. No.: 15/393,906

(22) Filed: Dec. 29, 2016

(65) Prior Publication Data

US 2018/0187881 A1    Jul. 5, 2018

(51) Int. Cl.
| | |
|---|---|
| *F21S 4/00* | (2016.01) |
| *F21V 33/00* | (2006.01) |
| *F21V 23/02* | (2006.01) |
| *F21V 23/04* | (2006.01) |
| *B44F 1/00* | (2006.01) |
| *B44C 3/12* | (2006.01) |
| *B44C 5/00* | (2006.01) |
| *F21V 8/00* | (2006.01) |
| *F21Y 103/33* | (2016.01) |
| *F21Y 115/20* | (2016.01) |
| *F21W 121/00* | (2006.01) |

(52) U.S. Cl.
CPC ............ *F21V 33/0028* (2013.01); *B44C 3/12* (2013.01); *B44C 5/00* (2013.01); *B44F 1/00* (2013.01); *F21V 23/02* (2013.01); *F21V 23/04* (2013.01); *F21W 2121/00* (2013.01); *F21Y 2103/33* (2016.08); *F21Y 2115/20* (2016.08); *G02B 6/0008* (2013.01)

(58) Field of Classification Search
CPC ...... F21V 33/0028; F21V 23/02; F21V 23/04; A47G 35/00; A63H 33/22; A63H 33/26
See application file for complete search history.

(56) References Cited

U.S. PATENT DOCUMENTS

| 4,617,751 A * | 10/1986 | Johansson ............. A01K 91/00 |
| | | 362/577 |
| 7,395,629 B1 * | 7/2008 | Thomas ................ A01K 77/00 |
| | | 43/11 |
| 2006/0227573 A1 * | 10/2006 | Chien .................... A41G 1/005 |
| | | 362/641 |

OTHER PUBLICATIONS

Screen capture of LED feather Mohawk Headdress with fiber optic lighting uploaded by Firebirdleather owner Nix Rodriguez, Jul. 16, 2015 based on published review (included), https://www.etsy.com/listing/206190130/led-feather-mohawk-headdress-with-fiber?ga_search_query=led&ref=shop_items_search_1 , Etsy.com, p. 1.*

(Continued)

*Primary Examiner* — Anh T Mai
*Assistant Examiner* — Matthew J. Peerce
(74) *Attorney, Agent, or Firm* — The Iwashko Law Firm, PLLC; Lev Ivan Gabriel Iwashko

(57) ABSTRACT

An illuminating dreamcatcher apparatus which provides a soothing visualization even when viewed in the dark includes a hoop member formed from a rigid circular shaped structural ring, a netting formed from an illuminating wire disposed in the open center of the hoop member and a plurality of decorative items hanging from the hoop member. The hoop member includes at least one hoop lighting element positioned around its circumferential edge as well as an electrical control unit that is wired to the hoop lighting elements and netting so as to allow the selective provision of electricity to the hoop lighting elements and netting. Each of the plurality of hanging decorative items defines a beaded strand with a fiber optic core so as to allow illumination from the hoop lighting element to be emitted from the bottom of the plurality of hanging decorative items.

7 Claims, 4 Drawing Sheets

(56) References Cited

OTHER PUBLICATIONS

Ch00ftech by Michael Ciuffo, Dimming EL wire Dreamcatcher, Oct. 2, 2012, http://ch00ftech.com/2012/10/02/dimming-el-wire-dreamcatcher/, pp. 1-8.*

Screen captures from youtube video clip "DreamCatcher EL wire", uploaded Jul. 10, 2013 by TravilaTequila, https://www.youtube.com/watch?v=CizpT_mODW8, youtube.com, Video :00-:12.*

Wikipedia, Electroluminescent wire, Mar. 2, 2008 per waybackmarchine, https://en.wikipedia.org/wiki/Electroluminescent_wire.*

Joel Bartlett, "EL wire Dreamcatcher", Dec. 24, 2014, joeleb.com.*

* cited by examiner

ILLUMINATING DREAMCATCHER NOVELTY APPARATUS

BACKGROUND OF THE INVENTION

Field of the Invention

This invention relates generally to novelty devices and, more particularly, to a an illuminating, hanging dreamcatcher novelty apparatus.

Description of the Prior Art

The design of dreamcatchers as handmade objects having a hoop with a loose net in its center and decorative items such as feathers and beads hanging down from its edge is well known. While dreamcatchers are known to have symbolic and spiritual significance in some Native American cultures, they also have become popular in some modern cultures for both novelty and cultural purposes. As such, there remains a need for a dreamcatcher apparatus which could provide soothing illumination through a plurality of lighting elements. It would be helpful if such an illuminating dreamcatcher apparatus provided illumination in its net center, about its circumferential edge, and from its decorative hanging items. It would be additionally desirable for such an illuminating dreamcatcher apparatus to include an onboard power supply which could direct electricity to the plurality of lighting elements.

The Applicant's invention described herein provides for an illuminating dreamcatcher apparatus adapted to allow a user to enhance the appearance of a dreamcatcher when viewed in the dark. The primary components in Applicant's illuminating dreamcatcher apparatus are a hoop member, a netting, and hanging decorative items. When in operation, the illuminating dreamcatcher apparatus enables more the provision of a decorative effect on a dreamcatcher even in the dark. As a result, many of the limitations imposed by prior art structures are removed.

SUMMARY OF THE INVENTION

An illuminating dreamcatcher apparatus which provides a soothing visualization even when viewed in the dark. The illuminating dreamcatcher apparatus comprises a hoop member defining a rigid circular shaped structural ring, a netting formed from an illuminating wire disposed in the open center of the hoop member and a plurality of decorative items hanging from the hoop member. The hoop member includes at least one hoop lighting element positioned around its circumferential edge as well as an electrical control unit that is wired to the hoop lighting elements and netting so as to allow the selective provision of electricity to the hoop lighting elements and netting. Each of the plurality of hanging decorative items defines a beaded strand with a fiber optic core so as to allow illumination from the hoop lighting element to be emitted from the bottom of the plurality of hanging decorative items.

It is an object of this invention to provide an illuminating dreamcatcher apparatus which provides soothing illumination through a plurality of lighting elements.

It is another object of this invention to provide an illuminating dreamcatcher apparatus which provides illumination in its net center, about its circumferential edge, and from its decorative hanging items.

It is yet another object of this invention to provide an illuminating dreamcatcher apparatus which includes an onboard power supply which could direct electricity to the plurality of lighting elements.

These and other objects will be apparent to one of skill in the art.

DETAILED DESCRIPTION OF THE INVENTION

Figure 1:
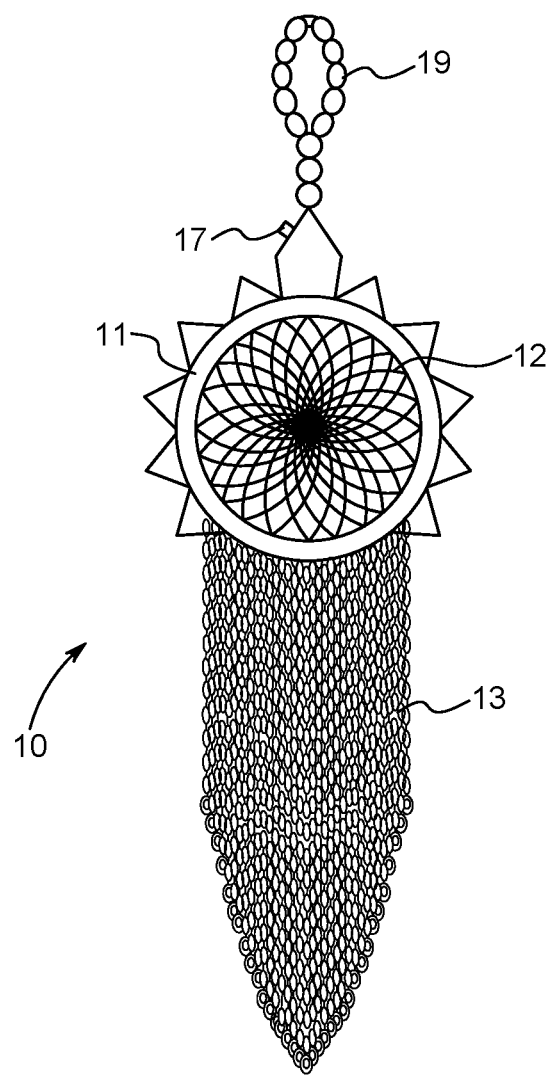
FIG. 1 is a front side elevational view of an illuminating dreamcatcher apparatus built in accordance with the present invention.
Figure 2:
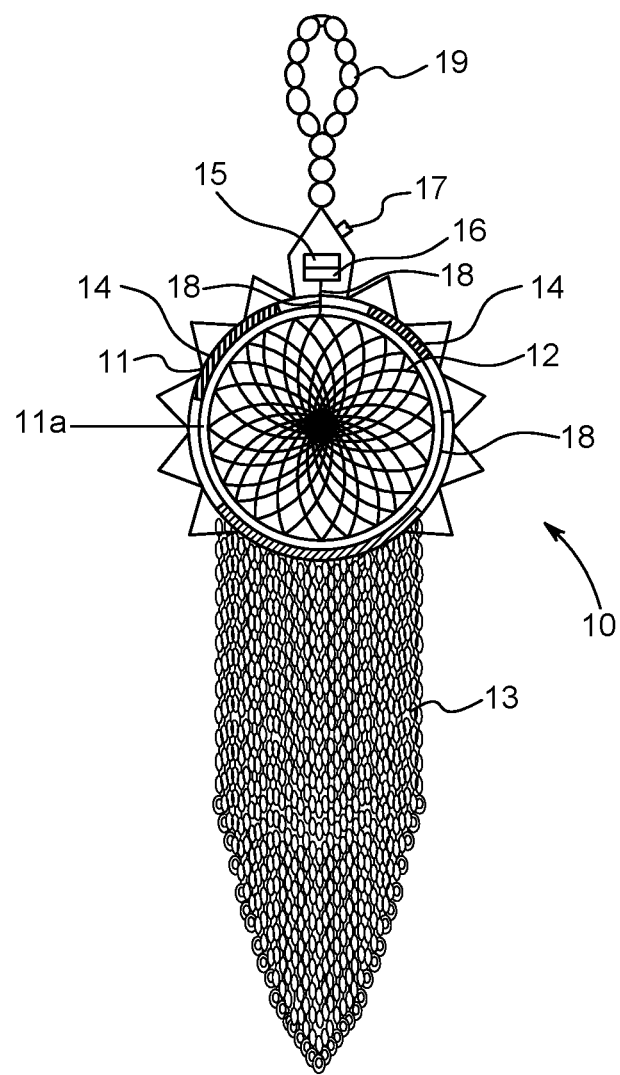
FIG. 2 is a rear side elevational view of an illuminating dreamcatcher apparatus built in accordance with the present invention.
Figure 3:
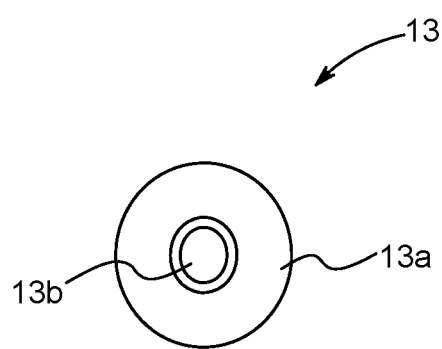
FIG. 3 is a cross sectional view of a hanging decorative item beaded strand for an illuminating dreamcatcher apparatus built in accordance with the present invention.

Referring now to the drawings and in particular FIGS. 1 and 2, an illuminating dreamcatcher apparatus 10 is shown having a hoop member 11, a netting 12 and a plurality of hanging decorative items 13. In one embodiment, the hoop member 11 defines a rigid circular shaped structural ring with a front side and a rear side. Integral with the hoop member 11 is an electrical control unit and a plurality of hoop lighting elements 14, with the hoop lighting elements 14 positioned at various locations around the circumferential edge of the hoop member's 11 rear side. The electrical control unit includes a battery 15, an inverter 16, and a mechanical actuator switch 17 and is wired to the hoop lighting elements 14 through electrical wire 18 so as to allow the selective provision of electricity from the battery 15 to be supplied to the hoop lighting elements 14 and netting 12 (by way of the inverter 16, as described below) by way of mechanical actuation of the mechanical actuator switch 17. In one embodiment, the mechanical actuator switch 17 defines a toggle switch.

In one embodiment, the hoop lighting elements 14 each define a portion of electroluminescent wire that glows when an alternating current is applied to it. As such, the hoop lighting elements 14 illuminate when supplied with electricity from the battery 15 that has been converted to alternating current by the inverter 16.

Figure 4:
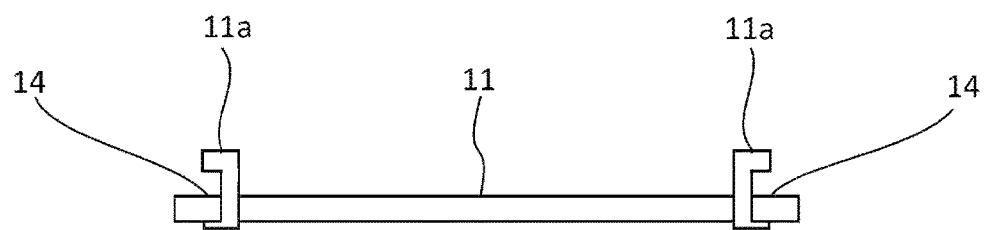
FIG. 4 is cross sectional side view of a hoop member and a blocking member connected to a rear side of the hoop member built in accordance with the present invention.

Referring to FIGS. 2 and 4, the hoop lighting elements 14 are partially covered by a blocking member 11a mounted to the rear side of the hoop member 11 so as to prevent light from the hoop lighting elements 14 from going towards the netting 12 (forcing all light being emit outward).

The netting 12 is disposed in the open center of the structural ring that defines the hoop member 12 and in one embodiment, also defines electroluminescent wire. It is contemplated that the netting 12 and the hoop lighting elements 14 are formed from different wires and thus may be different colors. As with the hoop lighting elements 14, however, the electroluminescent wire which defines the netting 12 is wired to the electrical control unit through electrical wire 18 and illuminate when supplied with electricity from the battery 15 that has been converted to alternating current by the inverter 16.

In the illustrated embodiment, the each of the plurality of hanging decorative items 13 defines a beaded strand that includes a bead exterior 13a. In one embodiment, each of the strands which form plurality of hanging decorative items 13 includes a single or group of optical fibers 13b therein such that each hanging decorative item 13 has an optical fiber core. As a result, illumination from the lowermost hoop lighting element 14, which the hanging decorative items 13 hang directly beneath, passes through the optical fiber core of each the plurality of hanging decorative items 13 and is emitted from the bottom of the plurality of hanging decorative items 13.

It is contemplated that by way of the arrangement of hoop lighting elements 14, netting 12, and hanging decorative items 13 (with optical fiber core), illumination in a first color or pattern of colors can be presented in the netting 12 while illumination in a second color or pattern of colors can be presented around the perimeter of the hoop member 11 and the bottom of the hanging decorative items 13.

In one embodiment, the illuminating dreamcatcher apparatus 10 additionally includes a mounting member 19.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An illuminating dreamcatcher apparatus, comprising:
   a hoop member defining a structural ring with an open center, wherein said hoop member includes a front side and a rear side;
   at least one hoop lighting element integral with the rear side of said hoop member wherein said at least one hoop lighting element is adapted to illuminate when supplied with electricity;
   a netting disposed in the open center of the hoop member, wherein said netting is adapted to illuminate when supplied with electricity;
   a blocking member to partially cover a rear side of the hoop member so as to prevent light from the hoop lighting elements from going towards the netting, such that light illuminating from the at least one hoop lighting element is emitted outward away from the netting;
   an electrical control unit having a power source and integral with said hoop member, wherein said electrical control unit is wired to both the at least one hoop lighting element and netting and adapted to selectively supply electricity from the power source to both the at least one hoop lighting element and netting; and a plurality of decorative items hanging from the hoop member, wherein each of said plurality of decorative items defines an elongated strand that has an optical fiber core, wherein said plurality of decorative items are connected to the hoop member such that illumination from the at least one hoop lighting element passes through the optical fiber core of said plurality of decorative items.

2. The illuminating dreamcatcher apparatus of claim 1, wherein said netting is constructed of an illuminating material.

3. The illuminating dreamcatcher apparatus of claim 1, wherein:
   said netting and said at least one hoop lighting element each define an electroluminescent wire; and
   said electrical control unit is adapted to covert electricity from the power source to alternating current prior to supplying electricity from the power source to both the at least one hoop lighting element and netting.

4. The illuminating dreamcatcher apparatus of claim 3, wherein said electrical control unit includes an inverter to covert electricity from the power source to alternating current.

5. An illuminating dreamcatcher apparatus, comprising:
   a hoop member defining a structural ring with an open center, wherein said hoop member includes a front side and a rear side;
   at least one hoop lighting element integral with the rear side of said hoop member wherein said at least one hoop lighting element is adapted to illuminate when supplied with electricity;
   a netting constructed of an illuminating material and disposed in the open center of the hoop member, wherein said netting is adapted to illuminate when supplied with electricity;
   a blocking member to partially cover a rear side of the hoop member so as to prevent light from the hoop lighting elements from going towards the netting, such that light illuminating from the at least one hoop lighting element is emitted outward away from the netting;
   an electrical control unit having a power source and integral with said hoop member, wherein said electrical control unit is wired to both the at least one hoop lighting element and netting and adapted to selectively supply electricity from the power source to both the at least one hoop lighting element and netting; and
   a plurality of decorative items hanging from the hoop member, wherein each of said plurality of decorative items defines an elongated strand that has a optical fiber core and are connected to the hoop member such that illumination from the at least one hoop lighting element passes through the optical fiber core of said plurality of decorative items.

6. The illuminating dreamcatcher apparatus of claim 5, wherein:
   said netting and said at least one hoop lighting element each define an electroluminescent wire; and
   said electrical control unit is adapted to covert electricity from the power source to alternating current prior to supplying electricity from the power source to both the at least one hoop lighting element and netting.

7. The illuminating dreamcatcher apparatus of claim 6, wherein said electrical control unit includes an inverter to covert electricity from the power source to alternating current.

* * * * *